(No Model.)
L. C. PRATT.
TWO WHEELED VEHICLE.
No. 435,710. Patented Sept. 2, 1890.
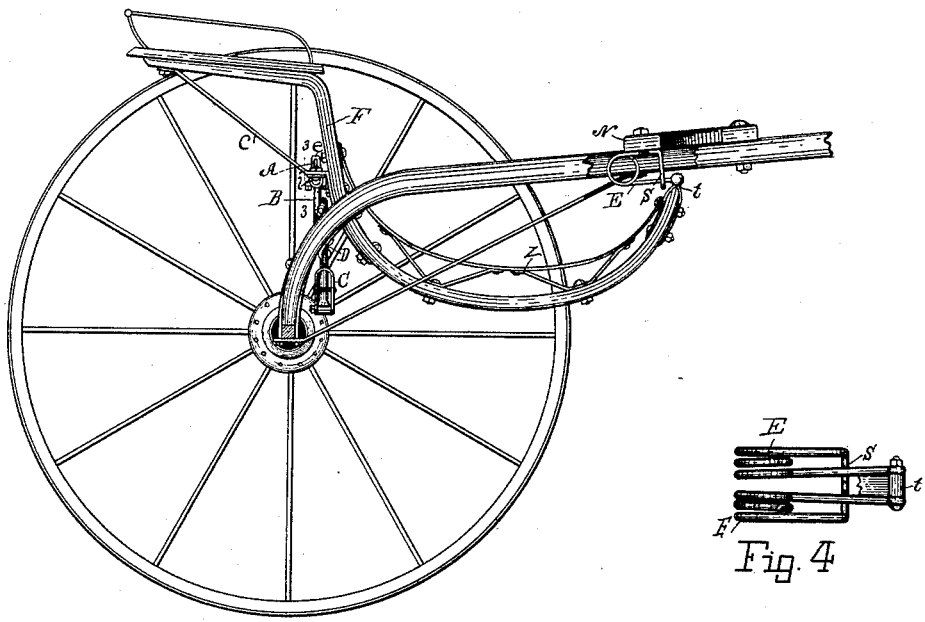
Fig. 1
Fig. 4
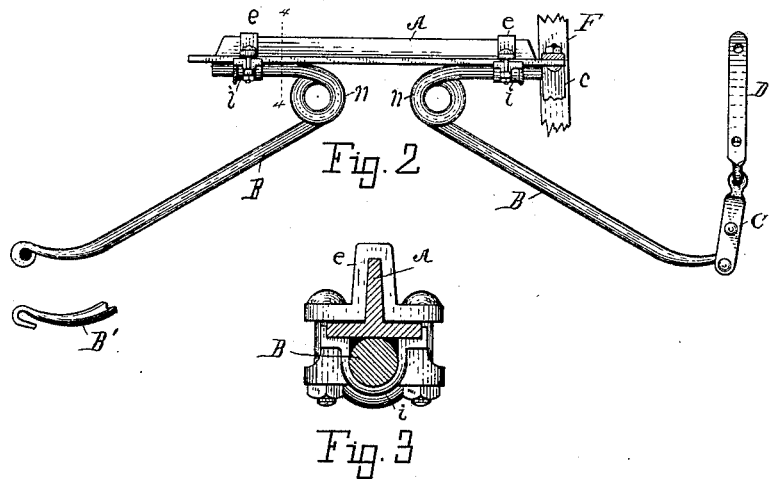
Fig. 2
Fig. 3
Witnesses:
Inventor.
Lemuel C Pratt
By Lucius C West
Att'y.

UNITED STATES PATENT OFFICE.

LEMUEL C. PRATT, OF KALAMAZOO, MICHIGAN.

TWO-WHEELED VEHICLE.

SPECIFICATION forming part of Letters Patent No. 435,710, dated September 2, 1890.

Application filed February 24, 1890. Serial No. 341,592. (No model.)

*To all whom it may concern:*

Be it known that I, LEMUEL C. PRATT, a citizen of the United States, residing at Kalamazoo, county of Kalamazoo, State of Michigan, have invented a new and useful Two-Wheeled Vehicle, of which the following is a specification.

This invention relates to that style of two-wheeled vehicles the front and rear ends of the body of which are supported by springs.

The invention has for its object to attach the front end of the body to the thill or thill cross-bar by a peculiarly-constructed spring or springs designed to obviate horse motion.

Other objects have reference to the springs which support the body over the axle and the means for attaching said springs to the vehicle.

In the drawings forming a part of this specification, Figure 1 is a side elevation with parts removed. Fig. 2 is a rear elevation of lettered details from Fig. 1, enlarged, part being in section on line 3 3 in Fig. 1. Fig. 3 is a section on line 4 4 in Fig. 2, enlarged; and Fig. 4 is a plan of a spring shown in Fig. 1.

Referring to the lettered parts of the drawings, the spring at the forward end of the body F is bent from a piece of spring wire or rod, forming arms which are pivoted to the end of the body at $t$, and having spirals E E, from which spirals the wire extends forward and then downward, forming a loop S, through which loop the arms pass. This spring is attached to the thill cross-bar N, as in Fig. 1, or the spring may be attached directly to the thill. The design is to employ one of these springs at each front corner of the body. When the rear end of the body is borne down by the weight of the rider, the arms of the front springs spring upward in the loops S, and during the movement of the vehicle the arms play up and down in said loops. By this means the forward springs receive the shock when going over rough places, and said springs receive the motion given to the thills by the horse and prevent it being imparted to the body. At the same time the loops S prevent the body from being unduly borne down at the front end when the rider is entering the body or standing in the same from the fact that the arms will then rest on the lower bar of the loops.

At A is a transverse bar, T-shaped in cross-section, and attached to the back of the body below the seat, as in Figs. 1 and 2. As here shown, the ends of the bars A are bolted to the braces $c$.

In Fig. 2, B B are springs bent out of elastic metal, having the spiral $n$, an arm extending from thence laterally, which is attached to the bar A, and an arm extending from said spiral outward and downward and adjustably pivoted to one of the bolts $a$ of the swinging link C, said link being jointedly connected to a strap D, which strap is bolted to the thill. This construction is of course alike at both sides of the vehicle.

The object of providing the links C with more than one bolt $a$ is so that the end of the lower arm may be attached at a higher or lower point, according to the weight to be borne by the vehicle. This adjustment may be accomplished by freeing the eyed end of the spring from one of the bolts $a$ and attaching it to another; but I prefer to make this end of the spring hooked, as at B′, Fig. 2, in which case the bolts $a$ would not have to be removed to make the adjustment, because by raising the lower arm of the spring and swinging the link C inwardly the hook can be readily detached from the bolt.

In Figs. 1, 2, and 3, $e$ is a casting formed to fit over the upper flange of the inverted T-bar. $i$ is a casting adapted to fit the under side of the upper arm of the spring B and to fit against the under side of the T-bar at each side, and the castings are bolted together, so as to firmly clamp the spring and T-bar. By loosening the bolts which clamp these castings the springs B may be adjusted laterally in accordance with the exact position they should occupy, which is governed more or less in accordance with the adjustment of the outer end of the lower arm. While these springs B form a very desirable elastic support to the body and this method of attaching them to the body is very strong and effectual, still so far as the springs at the front end of the body are concerned, other suitable styles of rear springs may be used. The truss $z$ of the bowed seat-bars shown in Fig. 1 is the same as that shown and described in another pending application, and forms no part of this invention.

Having thus described my invention, what I claim as new, and desire to secure by Letters Patent of the United States, is—

1. In a two-wheeled vehicle the body of which is elastically supported at the rear, the front spring comprising the spirals, the loop, and the arms for attaching to the end of the body, said arms passing through the loop, substantially as set forth.

2. In a two-wheeled vehicle, the combination of the body, the thills, and springs attaching the front end of the body to the thills, said springs having arms to which the end of the body is pivoted, and a loop through which said arms pass, whereby an undue downward movement of the front end of the body is prevented, substantially as set forth.

3. In a two-wheeled vehicle, the combination of the body, the thills, the transverse inverted T-bar attached to the back of the body, the springs consisting of the spirals, and the upper and lower arms extending laterally therefrom, the outer ends of the lower arms being link-connected to the thills, and the castings which clamp the upper arms to the inverted T-bar, substantially as set forth.

4. In a two-wheeled vehicle, the combination of the body, thills, and the springs comprising the spirals, the upper and lower lateral arms, the upper arms being attached to the body so as to be laterally adjustable, and the links jointedly attached to the thills, said links having a series of pivotal bolts to which the outer end of said lower arms are adjustably attached, substantially as set forth.

In testimony of the foregoing I have hereunto subscribed my name in presence of two witnesses.

LEMUEL C. PRATT.

Witnesses:
H. L. PRATT,
BELLE C. FREEMAN.